May 1, 1951
C. HART
2,550,693
TORQUE METER
Filed Nov. 13, 1944
3 Sheets-Sheet 1
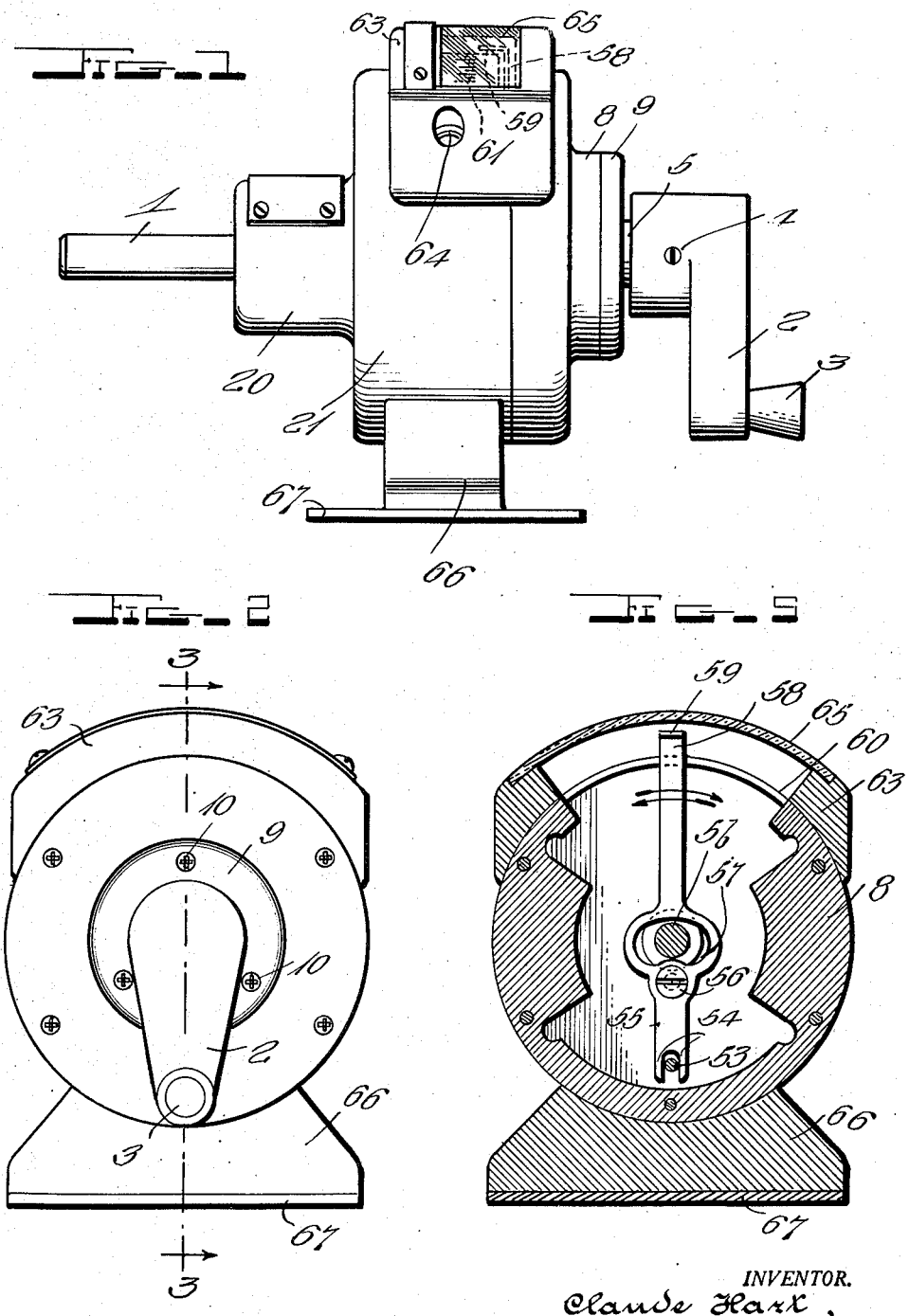
INVENTOR.
Claude Hart,
BY
John B. Brady
ATTORNEY May 1, 1951  C. HART  2,550,693
TORQUE METER
Filed Nov. 13, 1944  3 Sheets-Sheet 2
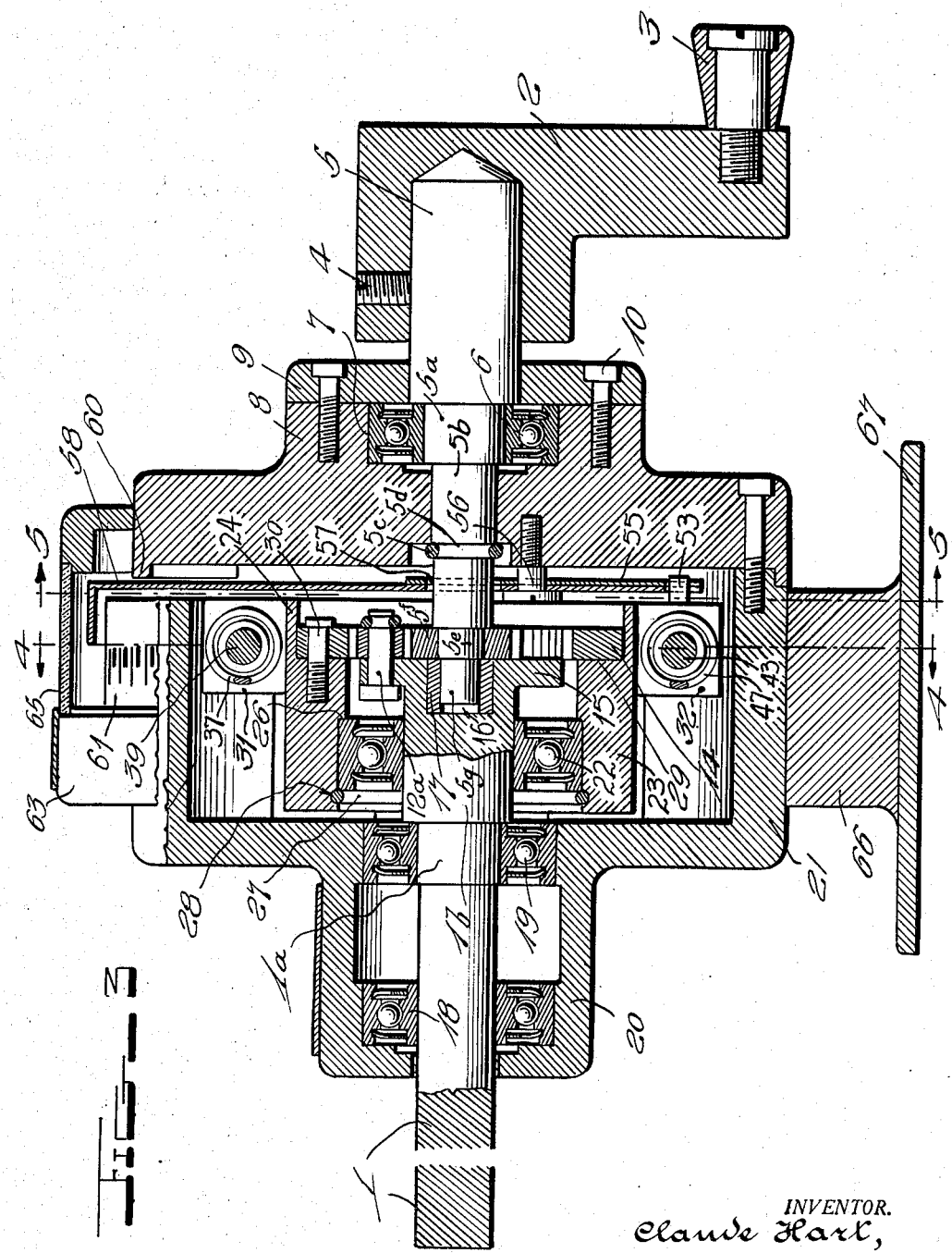
INVENTOR.
Claude Hart,
BY
John B. Brady
ATTORNEY

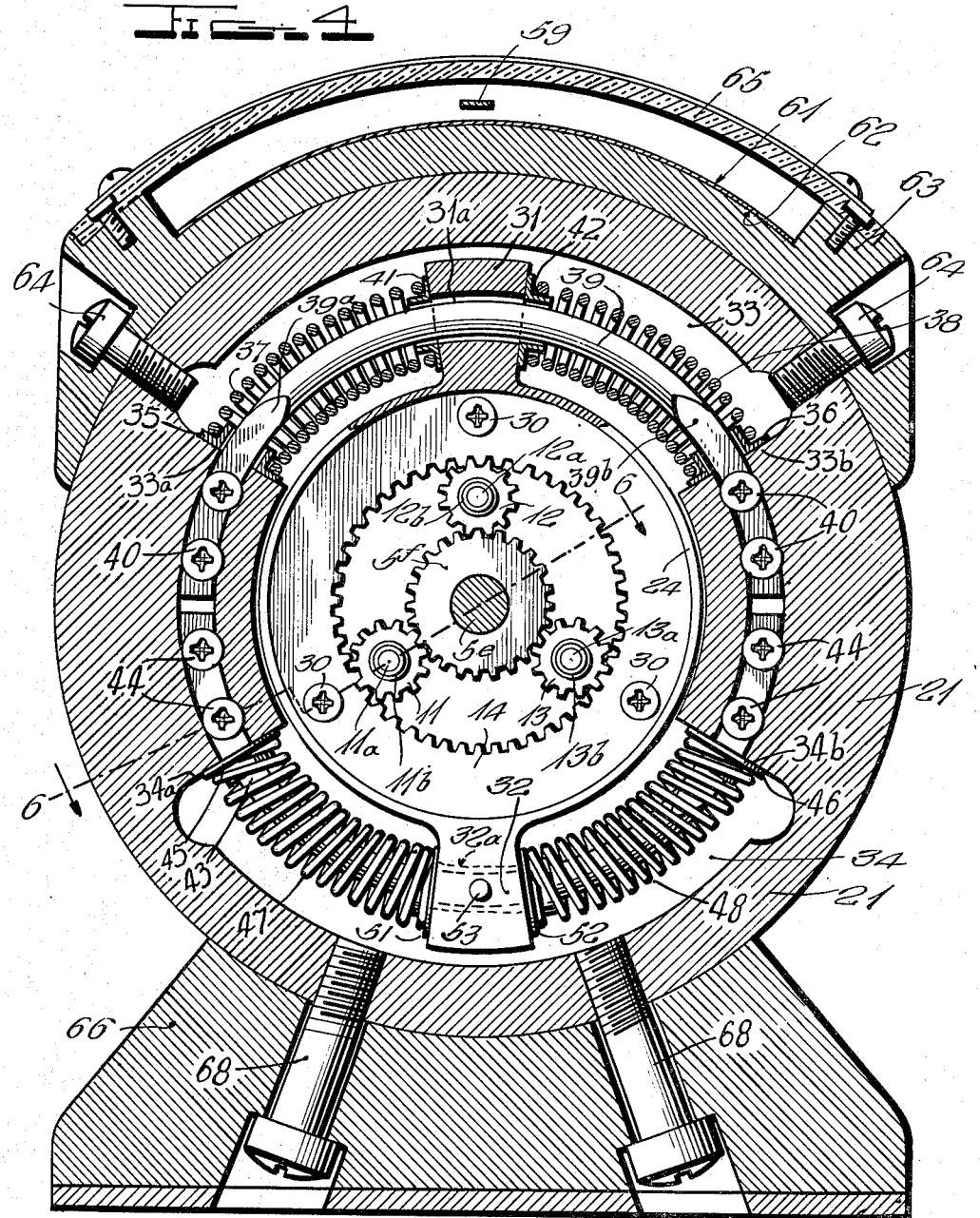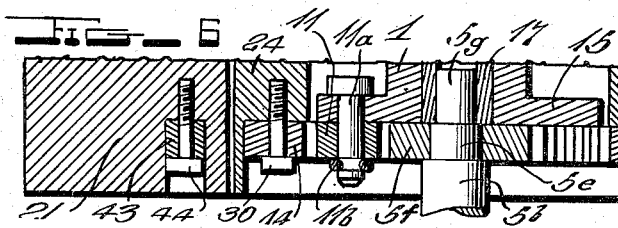

Patented May 1, 1951

2,550,693

UNITED STATES PATENT OFFICE 2,550,693

TORQUE METER

Claude Hart, Cedar Rapids, Iowa, assignor to Collins Radio Company, Cedar Rapids, Iowa, a corporation of Iowa Application November 13, 1944, Serial No. 563,215

11 Claims. (Cl. 73—136)

My invention relates broadly to apparatus for measuring torque in the rotation of control shafts, and more particularly, to an improved construction of portable torque meter which may be used in determining the required torque for controlling the rotation of shafts.

One of the objects of my invention is to provide a construction of improved, readily portable torque meter, which is simple in construction and which may be manufactured inexpensively on a mass production scale, and which will provide a precision indication of the torque required for the operation of control shafts.

Still another object of my invention is to provide a precision type of torque meter employing a planetary gear system interposed between the load and applying force for simultaneously transmitting the required force for revolving the shaft connected to the load, and indicating the torque required for rotation of the load shaft.

Still another object of my invention is to provide a compact assembly of planetary gear system arranged between the force applying means and the force utilizing means in combination with a calibrated force indicating means for accurately showing the force required to rotate the shaft connected to a predetermined load.

Still another object of my invention is to provide a precision type of torque meter in which a substantially floating indicator system operates adjacent a calibrated scale through movement imparted to a rotatable load shaft from a force applying shaft for accurately indicating the torque necessary to move the load shaft.

Other and further objects of my invention will be set forth more fully in the specifications hereinafter following by reference to the accompanying drawings in which:

Figure 1 is a side elevational view of the torque meter of my invention; Fig. 2 is an end view of the torque meter showing the operating crank thereof; Fig. 3 is an enlarged longitudinal sectional view through the torque meter of my invention; Fig. 4 is a transverse sectional view on line 4—4 of Fig. 3; Fig. 5 is a vertical sectional view taken on line 5—5 of Fig. 3; and Fig. 6 is a fragmentary sectional view taken substantially on line 6—6 of Fig. 4.

Torque wrenches heretofore available in the art have included a relatively long operating arm so shaped as to be very unhandy in use where attempt is made to measure the torque required to rotate relatively small control shafts. It is almost impossible to secure constant and smooth rotation using such torque wrenches as have heretofore been available in the art. I have found that in the adjustment of control shafts in autotune apparatus of the type shown in A. A. Collins Letters Patents No. 2,150,362 dated March 14, 1939, for Control Circuit for Signal Transmitting and Receiving Apparatus; 2,164,309, dated July 4, 1939, for Shaft Positioning Device; 2,165,226, dated July 11, 1939, for Automatic Tuning System and Apparatus; 2,168,326, dated Aug. 8, 1939, for Automatic Tuning System and Apparatus; 2,174,552, dated Oct. 3, 1939, for Automatic Tuning Apparatus; 2,285,414, dated June 9, 1942, for Control System and Apparatus; 2,285,415, dated June 9, 1942, for Motor Control System, by use of the torque meter of my invention I am able to supply a continuous flow of power to a shaft and obtain a continuous indication of the torque applied to the shaft. The torque meter of my invention has a convenient shape and may be readily used as a coupler between shafts and as a speed change device in stepping the speed either up or down.

Referring to the drawings in detail, reference character 1 indicates the load shaft which connects to the rotatable shaft whose torque is to be measured. Reference character 2 designates the crank which is manually operated by grasping knob 3 and rotating the crank in such direction as to impart the correct direction of rotation to the load. The crank 2 is fixed by a suitable set screw 4 to the shaft member 5, which is journalled in the ball bearing race represented generally at 6, housed within the cylindrical race 7 formed in the end 8 of the casing of the torque meter. The end 8 of the casing has an end plate 9 inserted from the end shaft 5 before application of crank 2 thereto and secured in position by means of screws 10. Screws 10 pass through plate 9 and enter the end plate 8 of the casing of the torque meter, as shown. Shaft 5 is reduced in section at 5a where it passes through the ball bearing race 6 and is further reduced in section at 5b where it passes through the end plate 8 and is secured in rotational position by means of resilient ring member 5c, which is engaged in annular groove 5d formed in the reduced section 5b of the shaft. The extension of the shaft section 5b is further reduced in section as represented at 5e forming a shaft section which carries the spur gear or sun pinion 5f of the planetary gear system consisting of planet gears 11, 12 and 13 coacting with the internally arranged ring gear 14. It will be clear that motion imparted to the spur gear or sun pinion 5f correspondingly imparts motion to planet gears 11, 12 and 13 and to the ring gear 14.

The planet gears 11, 12 and 13 are journalled on journal members 11a, 12a and 13a which project through the end flange 15 which is an integral part of the shaft 1 which connects to the load. The planetary gears 11, 12 and 13 are mounted in position on the journaling pins 11a, 12a and 13a by means of ring members 11b, 12b and 13b which engage in annular recesses in journaling pins 11a, 12a and 13a. The end flange 15 of the shaft 1 is axially recessed as represented at 16 and provided with a sleeve bearing 17 into which the end shaft 5 of reduced section shown at 5g extends. The end of shaft 5 is thus free to revolve within the end of shaft 1 for maintaining axial alignment between the force applying shaft 5 and the load utilizing shaft 1.

The load utilizing shaft 1 is supported in ball race bearings represented at 18 and 19. The ball race bearing 18 is internally mounted in the hub extension 20 of the casing 21 of the torque meter. The ball race bearing 19 is also supported interiorly of the casing 21 in line with the end wall thereof and serves to support the somewhat enlarged section 12 of shaft 1.

The shaft 1 also includes enlarged section 1b which extends to the flanged end 15 and serves as a supporting means for the ball race bearing 22. Ball race bearing 22 is secured within the hub 23 of the pointer actuating arm assembly 24. The pointer actuating arm assembly 24 has an internal annular shoulder 25, formed therein, against which the frame of the ball race bearing 22 abuts and is maintained in position by means of snap ring spring 27 which is engageable in annular recess 28 in the pointer actuating arm assembly 24. Thus the pointer actuating arm assembly 24 is respectively spaced from the section 1b of load shaft 1 permitting pointer actuating arm assembly 24 to float or turn freely within limits with respect to load shaft 1. The pointer actuating arm assembly 24 is recessed at the end thereof as represented at 29 for receiving the ring gear 14 which is secured in position with respect to the pointer actuating arm assembly 24 by means of screw members 30. Thus ring gear 14 is angularly displaceable under control of movement imparted by sun gear 5f through planetary gears 11, 12 and 13 meshing with sun gear 5f and ring gear 14, respectively.

The pointer actuating arm assembly 24 is provided with diametrically extending arms which I have shown at 31 and 32. Arms 31 and 32 are integral with the pointer actuating arm assembly 24 and project readily within circumferentially extending pockets or recesses 33 and 34 formed in casing or housing 21. The pockets or recessess 33 and 34 are terminated in limiting abutment faces represented at 33a and 33b and 34a and 34b against which ferrule-like washer members 35 and 36 abut with tubular extensions thereon which serve as means for supporting the ends of coil springs 37 and 38 and through which the spring guide member 39 freely passes. The spring guide member 39 is flattened at opposite ends thereon as represented at 39a and 39b to provide securing faces against which screw members 40 extended transversely through the wall of casing 21 abut for maintaining spring guide member 39 in position. Spring guide member 39 passes through aperture 31a in the arm 31. Ferrule-like washer members 41 and 42 abut against opposite faces of the tapered arm 31 and serve as seats to receive the ends of coil springs 37 and 38. Thus tapered arm 31 when displaced angularly operates to apply compressive forces to one of the coil springs while allowing expansive force to the other of the coil springs which maintain an axial position around the spring guide member 39 by virtue of the spacial position provided by the ferrule-like washer members 35—41 and 36—42 as heretofore explained.

The opposite tapered arm 32 is similarly spring mounted by means of the arrangement of spring guide member 43 which passes freely through aperture 32a in tapered arm 32 and is secured at opposite ends in sockets formed in casing 21 by means of screws 44 which extend through casing 21. The same arrangement of ferrule-like washer members is provided for mounting the opposite ends of coil springs 47 and 48 as represented at 45 and 46 and at 51 and 52. Thus angular displacement of tapered arm 32 is opposed by coil spring 47 or 48 depending upon the direction of the angular movement. It will be seen that the pointer actuating arm assembly 24 is rotatingly suspended for angular displacement in either a clockwise or counter-clockwise direction under control of the sets of peripherally disposed coil springs 37, 38, 47 and 48.

The pointer actuating arm assembly 24 has a pin 53 extending from the tapered arm 32. Pin 53 is arranged to engage the notched ends 54 of the arms 55 which constitute the indicator assembly. The arms 55 are pivoted by means of screw 56 to the end 8 of the casing and are provided with enlarged apertures 57 to embrace the force applying shaft 5b. One of the arms 55 extends adjacent the pointer actuating arm assembly 24 as represented at 58 and has a right turn therein terminating in a pointer 59. The end section 8 of the casing is provided with a peripheral nose 60 adjacent which indicator 58 is free to move. Pointer 59 operates over a calibrated scale 61 which is mounted within an arcuate recess 62 in member 63. Member 63 is secured to casing 21 by suitable screws 64. The dial window 65 is secured in position on member 63 to allow full visibility of calibrated scale 61 and the movement of pointer 59 with respect thereto.

The casing 21 is suitably mounted on a supporting base 66 and plate 67 by means of screw members 68 which extend into casing 21 and serve as a rigid support for the torque meter allowing the torque meter to be positioned close to the autotune head or apparatus whose torque is to be tested or determined. The load shaft 1 is connected to the autotune shaft or apparatus whose torque is to be measured and rotary motion applied through crank 2 to the load shaft 1 and its attached load. Since the pointer actuating arm assembly 24 is free to be displaced angularly against the restraining effect of coil springs 37—38, 47—48 a deflection occurs of pointer 59 with respect to calibrated scale 61 which is proportional to the torque delivered. The deflection force is the differential of the torque required to rotate the load shaft 1 and the torque applied to the crank 2. This differential force is directly indicated by the position of pointer 59 with respect to calibrated scale 61. Ball bearings are used throughout the structure for reducing frictional losses in the meter which would be otherwise reflected as inaccurate torque readings. Thus an accurate determination of torque, either in a clockwise or a counter-clockwise direction, may be made.

In the claims I have referred to the assembly 24 as a reaction member the displacement of which is resisted by coil springs 37, 38, 47 and 48. The reaction member forms part of the gear means constituted by the planetary gear system including ring gear 14, planetary gears 11, 12 and 13 and the spur gear or sun pinion 5f.

While I have described my invention in one of its preferred embodiments, I realize that modifications may be made in details of construction and I intend no limitations upon my invention other than may be imposed by the scope of the appended claims.

What I claim and desire to secure by Letters Patent of the United States is as follows:

1. A torque measuring mechanism comprising a casing, a load shaft, a force applying means, a planetary gear system interposed between said load shaft and said force applying means, an indicator movable over a calibrated scale, yieldable means concentrically surrounding said planetary gear system and interposed between said planetary gear system and said casing for restraining the movement thereof, curved guide means extending through said yieldable means for confining said yieldable means in a circumferential path around said gear system, and means controlled by said planetary gear system for operating said indicator according to the torque required to move said load shaft.

2. A torque measuring apparatus comprising a casing, a load shaft, a force applying means, gear means interposed between said load shaft and said force applying means, said gear means including a reaction member, sets of coil springs disposed in a circular path encircling said gear means and yieldably interposed between said reaction member and said casing for restraining the movement thereof, curved guide members extending axially through said coil springs, and an indicator movable over a calibrated scale and variably controlled by said reaction member for indicating on said calibrated scale the torque required to move said load shaft.

3. Torque measuring mechanism comprising a casing, a load shaft, a force applying means, gear means interconnecting said force applying means and said load shaft, said gear means including a reaction member, an indicator movable over a calibrated scale and a multiplicity of coil springs arranged in a circular path concentrically surrounding said gear means and yieldably interposed between said reaction member and said casing for restraining the movement thereof, curved rod-like members extending through said coil springs and controlled by said reaction member, said indicator having a portion thereof extending on opposite sides of said force applying means and angularly movable under control of said reaction member to measure torque at said load shaft in either a clockwise or counterclockwise direction.

4. A torque meter comprising a frame structure, a load shaft journaled in one end of said frame structure, a force applying shaft journaled in the other end of said frame structure, gear means interposed between said shafts and housed within said frame structure, said gear means including a reaction member, a pair of radially extending arms connected with said reaction member, guide members supported by said frame structure and extending through said arms whereby said arms are displaceable circumferentially of said guide members, coil springs concentrically arranged over said guide members and yieldably interposed between said frame structure and opposite sides of said radially extending arms and disposed in a path concentrically surrounding said gear means for normally dynamically balancing said reaction member and yieldably resisting angular displacement thereof, indicator means angularly and variably controlled by movement of said reaction member, said indicator means terminating in an indicator pointer extending beyond said frame structure to a position disposed exteriorly thereof and a calibrated scale supported by said frame structure in coacting relation to the pointer of said indicator for visually indicating torque required to move said load shaft.

5. A torque meter comprising a rotary load shaft, a rotary force applying shaft, a casing, means for mounting said shafts in said casing in anti-friction bearings, a socket recess axially arranged in one of said shafts, an end portion on the other of said shafts extending into the socket recess in the aforementioned shaft, a planetary gear system coupling said shafts, a multiplicity of coil springs disposed in a path concentrically encircling said planetary gear system and interposed between said casing and the planetary gear system for restraining movement thereof and an indicator controlled by said planetary gear system and operative over a calibrated scale carried by said casing, said indicator being angularly displaceable in proportion to the torque delivered to said load shaft for visually indicating required torque applied at said force applying shaft.

6. A torque meter comprising a casing, a load shaft journalled in one end of said casing, a rotary force applying shaft journalled in the other end of said casing, a pointer actuating arm assembly, a planetary gear system coupling said shafts and said pointer actuating arm assembly, a calibrated scale mounted on said casing, means concentrically disposed about said planetary gear system and interposed between said casing and said planetary gear system for restraining the movement thereof and means extending axially of the aforesaid means for guiding the first-mentioned means in a circumferential path within said casing and a torque indicating pointer operated by said pointer actuating arm assembly and coacting with said calibrated scale for indicating the torque required to rotate said load shaft under control of torque applied to said rotary force applying shaft.

7. A torque meter comprising a casing, a load shaft journalled in one end of said casing, a force applying shaft journalled in the other end of said casing, a planetary gear system interconnecting the adjacent ends of said shafts, a pointer actuating arm assembly connected with said planetary gear system, radially extending arms connected with said pointer actuating arm assembly, means extending concentrically around said planetary gear system for yieldably maintaining said pointer actuating arm assembly in a balanced position within said casing, means axially related to the aforesaid means for guiding said first mentioned means in a circumferential path around said gear system a pointer connected with said pointer actuating arm assembly and a calibrated scale carried by said casing and with which said pointer coacts for indicating by deflection the torque required to rotate said load shaft.

8. A torque meter comprising a casing, a load shaft journalled in one end of said casing, a force applying shaft journalled in the other end of said casing, a planetary gear system interconnecting the adjacent ends of said shafts, a pointer actuating arm assembly connected with said planetary gear system, radially extending arms connected with said pointer actuating arm assembly, spring means interposed between said radially extending arms and said casing in a path concentrically encircling said planetary gear system for restraining said pointer actuating arm assembly against rotation, a pointer connected with said pointer actuating arm assembly, and a calibrated scale carried by said casing and with which said pointer coacts for indicating by deflection the torque required to rotate said load shaft.

9. A torque meter comprising a casing, a load shaft journalled in one end of said casing, a force applying shaft journalled in the other end of said casing, a planetary gear system interconnecting the adjacent ends of said shafts, a pointer actuating arm assembly connected with said planetary gear system, radially extending arms connected with said pointer actuating arm assembly, said arms being apertured in the direction of rotation thereof in a path concentrically encircling said planetary gear system, guide members fastened at each end to said casing and passing through the apertured arms, coil springs confined in spacial relation to said guide members between end abutments in said casing and the sides of said arms for restraining said pointer actuating arm assembly against rotation, a pointer connected with said pointer actuating arm assembly and a calibrated scale carried by said casing and with which said pointer coacts for indicating by deflection the torque required to rotate said load shaft.

10. A torque meter comprising a casing, a load shaft journalled in one end of said casing, a force applying shaft journalled in the other end of said casing, a planetary gear system interconnecting the adjacent ends of said shafts, a pointer actuating arm assembly connected with said planetary gear system, radially extending arms connected with said pointer actuating arm assembly, said arms being apertured in the direction of rotation thereof in a path concentrically encircling said planetary gear system, guide members each extending substantially 180° within said casing and through the apertured arms and secured at opposite ends to said casing, ferrule-like washer members surrounding said guide members and forming abutments with the said casing and opposite sides of said arms, coil springs encircling said guide members and disposed between the ferrule-like washer members for restraining said pointer actuating arm against rotation, a pointer connected with said pointer actuating arm assembly and a calibrated scale carried by said casing and with which said pointer coacts for indicating by deflection the torque required to rotate said load shaft.

11. A torque meter comprising a casing, a load shaft journalled in one end of said casing, a force applying shaft journalled in the other end of said casing, a pinion carried by the end of said last mentioned shaft within said casing, a flange carried by the end of the first mentioned shaft within said casing, planet gears journalled on said flange and meshed with said pinion, a pointer actuating arm assembly, a ring gear carried by said pointer actuating arm assembly and meshed with said planet gears, means concentrically encircling said ring gear and planet gears for yieldably balancing said pointer actuating arm assembly, a pointer controlled by said pointer actuating arm assembly and a calibrated scale carried by said casing and with which said pointer coacts for indicating by deflection the torque required to rotate said load shaft.

CLAUDE HART.

REFERENCES CITED

The following references are of record in the file of this patent:

UNITED STATES PATENTS

| Number | Name | Date |
|---|---|---|
| 28,925 | Warren et al. | June 26, 1860 |
| 670,324 | Leverkus | Mar. 19, 1901 |
| 1,429,165 | Rockstroh | Sept. 12, 1922 |
| 1,557,956 | Zubaty | Oct. 20, 1925 |
| 1,574,491 | Leake | Feb. 23, 1926 |
| 2,007,505 | Smith | July 9, 1935 |
| 2,289,285 | Chilton | July 7, 1942 |

FOREIGN PATENTS

| Number | Country | Date |
|---|---|---|
| 488,154 | Great Britain | July 1, 1938 |